Sept. 5, 1967  E. F. KINGMAN  3,339,409
WIND MONITORING APPARATUS
Filed July 6, 1964  2 Sheets-Sheet 1
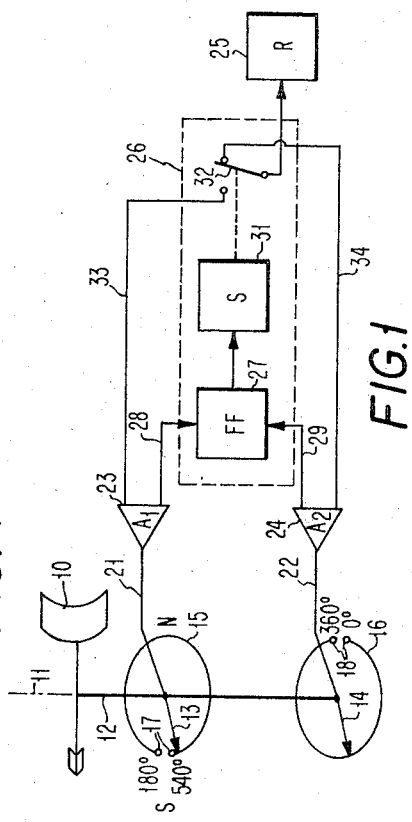
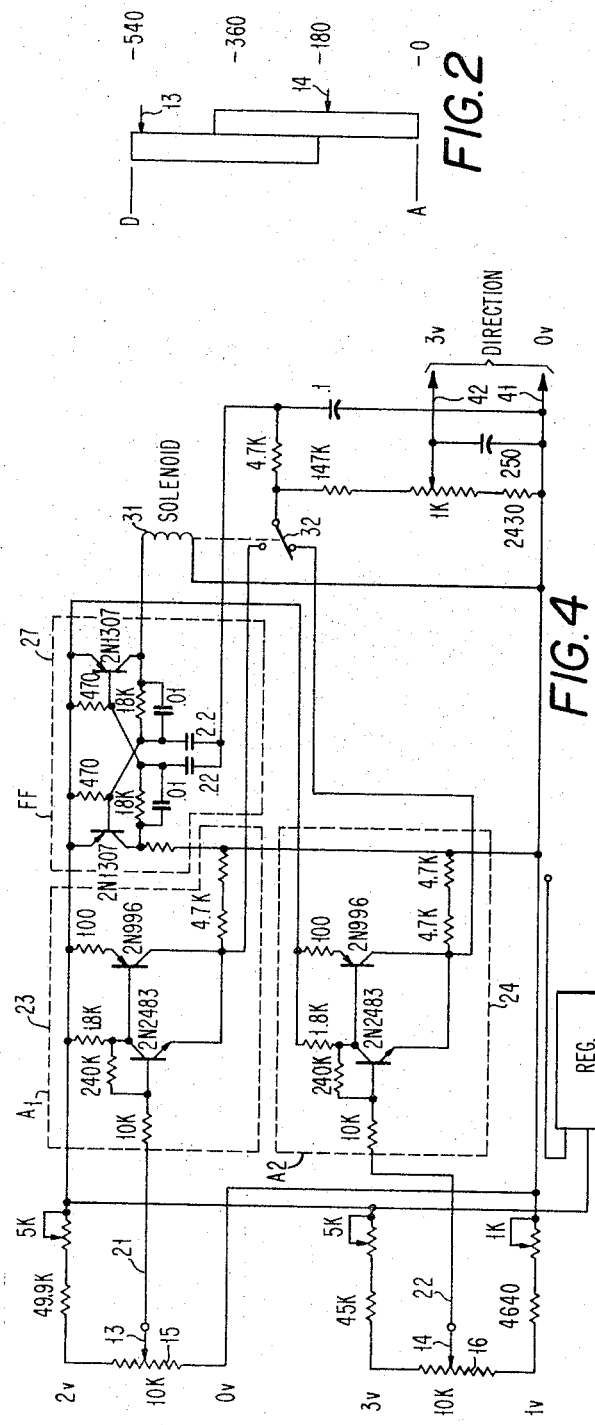
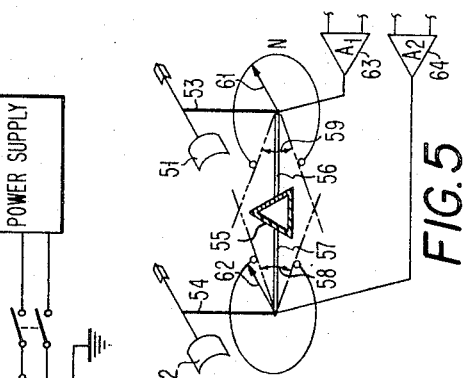
INVENTOR.
EDWARD F. KINGMAN
BY
Flehr and Swain
ATTORNEYS INVENTOR
EDWARD F. KINGMAN
By Flehr and Swain
ATTORNEYS

United States Patent Office 3,339,409
Patented Sept. 5, 1967

3,339,409
WIND MONITORING APPARATUS
Edward F. Kingman, Saratoga, Calif., assignor to Climet Instruments Inc., Sunnyvale, Calif., a corporation of California
Filed July 6, 1964, Ser. No. 380,320
1 Claim. (Cl. 73—188)

This invention relates to a system arranged to monitor the rotational position of a shaft, for example, as rotated by a wind vane. The system is particularly useful in eliminating problems associated with recording wind direction in the region of the null point (0° and 360°).

In making meterological observations wherein wind direction is plotted against time, strip chart recorders frequently are employed. In these recorders, a strip or tape of recording paper is drawn past a recording stylus. The stylus travels back and forth laterally between the side margins of the strip and its lateral position at a given moment represents present wind direction. Thus, the recording paper is normally graphically subdivided into columns and rows labelled to represent wind azimuth and time respectively. Plotting is continuous.

The side edges of the plotting area customarily represent azimuth readings of 0° and 360° respectively. Thus, as the wind vane makes the transition from an azimuth of 359° to 1°, the stylus sweeps across the full width of the graph. When the wind later "backs" to 359°, the stylus sweeps back across the full width of the chart. Whenever the wind settles in the region of this cross-over point, the chart soon becomes little more than a broad stripe spanning the entire width of the strip.

The wind vane must, of course, be free to rotate continuously both clockwise and counterclockwise. Otherwise, the above problem might possibly have been resolved merely by doubling, or tripling, the width of the scale of the graph.

In other applications of wind monitoring devices, the degree of rotational displacement of the wind vane is read out as a voltage which varies with rotational displacement. Where information regarding wind direction is fed to computers for digestion and analysis therein, measurements of wind direction based on sampling the voltage scale extremities will serve to provide unreliable results. Further, those systems employing pulse duration techniques respecting wind data will also encounter certain problems with respect to the cross-over point due to the repetitive switching back and forth between the scale extremities.

Thus, it is generally an object of the present invention to provide an improved wind monitoring apparatus.

It is another object of the invention to provide wind monitoring apparatus whereby the null point cross-over characteristic is virtually eliminated so as to provide greater information regarding direction in this region.

It is still another object of the invention to provide position monitoring apparatus for monitoring the rotational position of a member mounted for continuous rotation in opposite directions about an axis.

In monitoring the wind, frequently the wind vane will be supported upon a structure which serves to partially shield the wind vane from the full force of the wind. When the wind is of very low velocity, wind direction being monitored in the shielded sector becomes unreliable.

Accordingly, it is another object of the invention to provide wind monitoring apparatus giving reliable results notwithstanding the presence of supporting structures which might otherwise shield the wind vanes from the wind.

These and other objects of the invention will become more clearly apparent from the following detailed description of a preferred embodiment when considered in conjunction with the accompanying drawings in which:

FIGURE 1 is a schematic diagram of a wind monitoring system according to the invention;

FIGURE 2 is a diagrammatic bar graph representing the recording range for apparatus according to the present invention;

Figures 3, 3A:
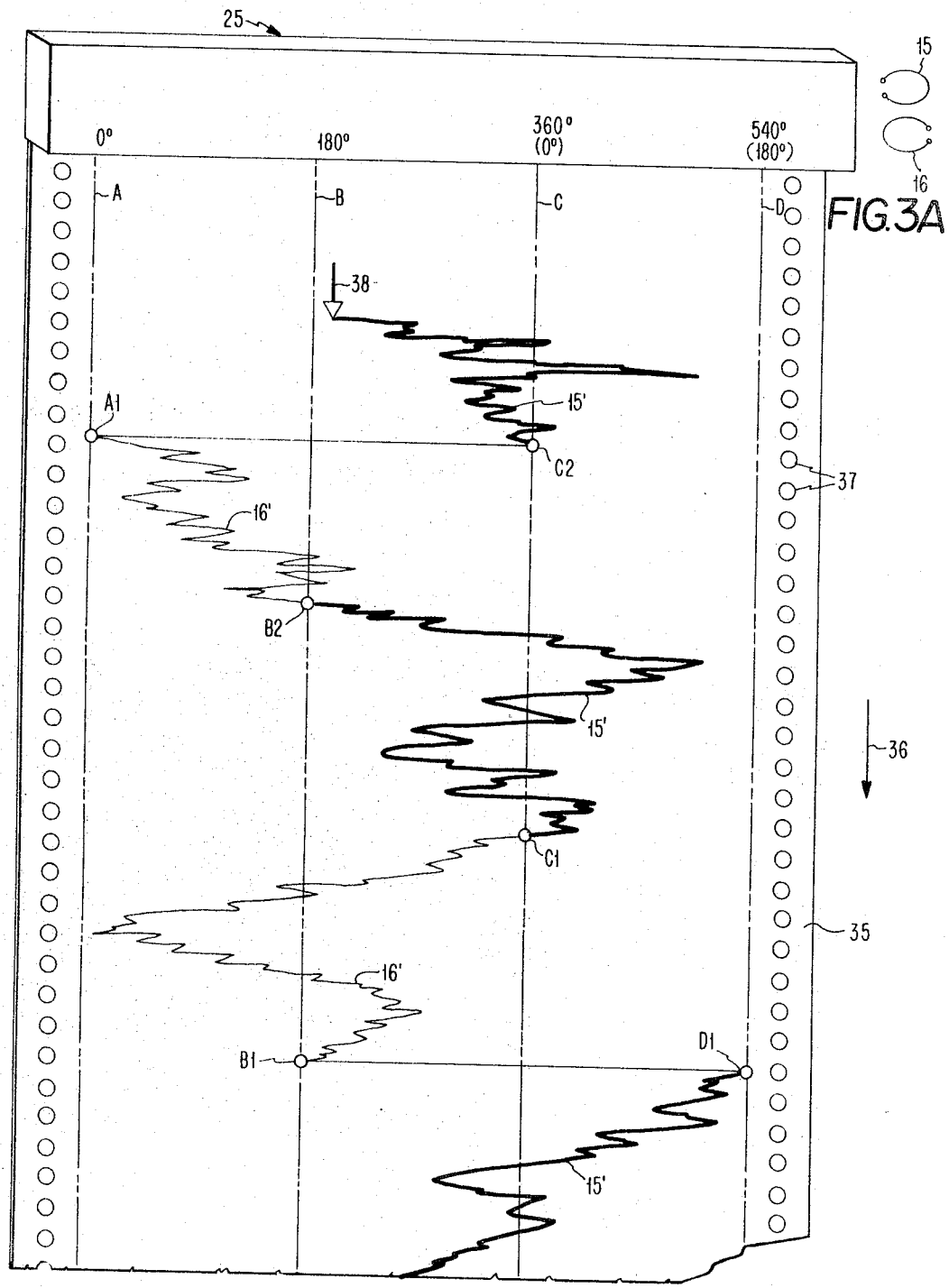

FIGURE 3 schematically shows a strip chart recorder sheet engaged in plotting wind direction under control of the present invention. The traces schematically represent control by the two signal sources respectively by employing different line widths for the traces. FIGURE 3A is a diagram for convenience.

FIGURE 4 is a schematic wiring diagram of an electrical circuit corresponding to the system shown in FIGURE 1; and FIGURE 5 is a schematic representation of another embodiment of wind monitoring apparatus according to the present invention.

In general, wind direction monitoring apparatus is provided which includes means rotationally positionable by the wind to move continuously with the wind in either of two directions. First and second angular position sensing means are provided, each of which serves to sense the angular displacement, through an associated range of angular rotation of the rotationally positionable means with respect to a predetermined reference point, for example, a compass heading of North. The opposite ends of the ranges being sensed are arranged to overlie one another whereby the opposite ends of that range associated with the first sensing means lies well within the range associated with the second sensing means and vice versa. Each of these two sensing means serves to provide a reference signal indicative of sensing the ends of its range.

Angular position read out means in the form, for example, of a strip chart recorder, is arranged to be selectively responsive to either of the two sensing means. Thus, in the example, the strip chart recorder can read out the azimuth from the wind vane as sensed by a selected one of the two sensing means. Bistable switch means decouples the strip chart recorder from the selected sensing means upon receipt of an end-of-range reference pulse. The switch means thereupon couples the strip chart recorder to the other sensing means.

By orienting the two sensing means rotationally out of phase with each other by a significant angular displacement, when the wind settles in the region of the cross-over point, the strip chart recorder will be switched to that sensing means which is operating generally in mid-scale and the monitoring will continue without repetitive sweeping back and forth across the width of the recording strip.

Further, where the position read out means takes the form of means responsive to a voltage or other electrical signal representative of the rotational position of the vane, repetitive sampling of signal extremes is eliminated.

As shown in FIGURE 1, there is provided a wind vane 10 positionable by the wind and mounted for continuous rotation in opposite directions about an axis 11. Axis 11 is defined by the rotationally positionable member 12.

First and second vane sensing means are provided. Thus, member 12 is coupled to drive the wipers 13, 14 of two potentiometers 15, 16 arranged with their respective end points 17, 18 disposed 180° out of phase. Accordingly, with respect to potentiometer 15, a first angular position sensing means is provided which serves to sense the angular displacement through an associated range (180° through 0° to 180°) of angular rotation for member 12 about axis 11 with respect to a predetermined reference point, e.g. North.

Similarly, potentiometer 16 serves to sense the angular displacement of member 12 through an associated range (0° to 360°) with respect to the same reference point, i.e. North. While the associated range of each sensing means in the arrangement described above is 360°, it will be seen from the description below that the extent of the range sensed in other embodiments can differ from the 360° above.

The output of each sensing means is respectively fed via leads 21, 22 to the amplifiers 23, 24.

Each of the two sensing means 15, 16 serves to provide a reference signal indicative of sensing the opposite ends of its associated range. Thus, when wiper 13 arrives at either of its end points 17, or when wiper 14 arrives at its end points 18, a transient pulse is signalled via lines 21 or 22 respectively to provide the above reference signal. This can be caused, using conventional potentiometers, when the wiper goes beyond the end of the resistance element so as to disconnect itself, e.g. from conductors 21, 22. This will cause a sudden change in the biasing of amplifiers 23 or 24.

Azimuth recording apparatus or other read-out means 25 is arranged to be selectively responsive to each of the two sensing means 15, 16 and serves to read out the angular displacement of vane 10 with respect to a reference point, such as North, as azimuth is being sensed by the selected one of the two sensing means.

Accordingly, switching means 26 is arranged to operably decouple read-out means 25 from the selected sensing means (15 or 16) upon receipt of a reference signal therefrom upon arrival of the wiper at the end points of its potentiometer. The switching means then operably couples the read-out means to the other sensing means.

Thus, as shown in FIGURE 1, a flip-flop 27 is arranged to operate between its two stable states. Flip-flop 27 is provided with two input channels 28, 29 whereby the end point reference signal of that sensing means being read out serves to switch the recording means 25 over to the other sensing means. Accordingly, a solenoid 31 is arranged to switch its armature 32 from one stable state to the other whereby an amplified output signal from wipers 13, 14 representing the rotational position of vane 10 is switched between leads 33 and 34.

Read-out means, such as the strip chart recording apparatus 25, is provided. Recorder 25 is arranged whereby a recording strip 35 is fed in the direction of arrow 36 by means of edge perforations 37 coacting with sprocket feed means (not shown).

Recording strip 35 is subdivided longitudinally into azimuth headings. The width of strip 35 serves to accommodate a recording range of 540°. As shown in FIGURE 3, four longitudinal transition lines A, B, C and D, respectively, represent azimuth headings of 0°, 180°, 360° (0°), and 540° (180°). A stylus 38 is arranged, as schematically shown, to be driven laterally of strip 35 in response to rotational movement of wind vane 10. Stylus 38 is arranged to follow the movements of either position sensing means 15 or 16 depending upon the position of armature 32.

Thus, for ease in understanding the operation of the system, as shown in FIGURE 3, that portion of the trace formed by stylus 38 derived from sensing means 15 is designated 15′ and is darkened, while that portion of the trace derived from sensing means 16 is identified as 16′. Transition points have been represented although they would not actually be marked. These points have been designated by a letter corresponding to the transition lines A–D noted above plus a number representing ordinal occurrence in the graph of FIGURE 3.

Thus, in operation, as shown in FIGURE 3, stylus 38 commenced its trace at the lower edge of sheet 35 and followed the trace portion 15′. This trace portion 15′ was derived from position sensing means 15 until wiper 13 arrived at end point 17 representing 540°, at transition point D1. Stylus 38 then moved directly from transition point D1 to B1. As shown in FIGURE 1, the reference signal derived from arrival of wiper 13 at its end point 17 served to flip the switch means 27 to condition solenoid 31 so as to move armature 32 to the position shown in FIGURE 1. Thus, wiper 14 is read out via line 34 to recorder 25 commencing at transition point D1. Accordingly, trace 16′ is developed by stylus 38 until wiper 14 arrives at its end point 18, corresponding to 360°, whereupon a transient pulse indicates the end of the associated range of wiper 14. This pulse switches flip-flop 27 back to its initial state.

After flip-flop 27 is switched, wiper 13 takes over in a mid-scale region of its potentiometer, 15. Thus, trace 15′ is resumed and continues until transition point B2 is reached, at which point stylus 38 is switched for control by wiper 14. As wiper 14 moves toward an azimuth of zero degrees, transition point A1 is ultimately reached and stylus 38 then moves directly to transition point C2 where it is again put under control of wiper 15.

From the foregoing, it can be seen that the only time that stylus 38 sweeps laterally across the recording strip 35 is from transition points D to B and A to C. It will also be noted that repetitive shifting back and forth is eliminated whereby only a single line is drawn on a record sheet should the wind settle in the region of the cross-over point.

An operating system according to the foregoing has been constructed as arranged in FIGURE 4 with the values and component designations as shown thereon. As shown in FIGURE 4, potentiometer 15 was arranged to operate between zero and 2 volts, and potentiometer 16 between 1 and 3 volts, and the output signal varied between 0 and 3 volts.

As shown in FIGURE 4, amplifiers 23 and 24 are respectively coupled to wipers 13, 14 and each includes a pair of oppositely poled transistors. Amplifiers 23, 24 are both coupled to switch the flip-flop 27 in known style whereby two inputs are provided to the flip-flop along lines 28, 29. Solenoid 31 is arranged to control armature 32 whereby an output voltage is developed between leads 41, 42. The voltage between leads 41, 42, as mentioned, varies from zero to 3 volts and represents rotational displacement of vane 10 through a range of 540°.

As will be noted in FIGURE 2, a pair of bar graphs are shown representing the range of operation of wipers 13, 14 with respect to one another.

In another embodiment as shown in FIGURE 5, the means rotationally positionable by the wind to move continuously with the wind in either of two directions includes the two wind vanes 51, 52 each of which is mounted upon a shaft 53, 54 for continuous rotation in opposite directions through 360°. In the arrangement in FIGURE 5, as schematically shown, a vertical mast or tower 55 supports each of the two vanes 51, 52 upon laterally extending arms 56, 57.

It is further assumed that vanes 51, 52 are partially shielded by mast 55 as is frequently encountered. Thus, vane 52 is considered to be partially shielded by mast 55 from wind coming within the angle 58. Similarly, partial shielding is also considered to affect the reading of vane 51 when wind falls within the angle 59.

Accordingly, each vane 51, 52 drives its own wiper 61, 62 to provide signals via associated amplifiers 63, 64 corresponding to amplifiers 23, 24 in the system shown in FIGURES 1 and 4. The remainder of the recording system corresponds to that previously described with respect to FIGURE 1. As thus arranged, in operation, it will be readily apparent that first and second angular positions sensing means have been provided wherein the associated range of each is something less than 360° but the opposite ends of the range associated with the first sensing means lies well within the range associated with the second sensing means and vice versa whereby constant and repetitive shifting back and forth of the stylus 38 is precluded.

From the foregoing, it will be readily evident that there is provided a position monitoring apparatus wherein loss of data in the region of the cross-over point has been eliminated. The apparatus according to the foregoing further provides improved digital and pulse duration data handling techniques as well as serving to enhance data reliability where wind direction input information is fed to computer apparatus which would otherwise be sampling scale extremities.

I claim:

In apparatus for monitoring wind direction having wind vane means, positionable by changes in the direction of wind, mounted for continuous rotation in opposite directions to follow the azimuth of the wind, and having a strip chart recorder serving to read out the angular displacement of the wind vane means with respect to a predetermined azimuth, the system comprising first and second angular position sensing potentiometers each adapted to sense the angular displacement, through an associated range of angular rotation, of the wind vane means with respect to said predetermined azimuth, the opposite ends of that range associated with the first sensing potentiometer lying well within the range associated with the second potentiometer and vice versa, each potentiometer serving to provide an electrical reference signal indicative of sensing the opposite ends of its associated range, and a flip-flop selectively operable between a first and second stable state to respectively provide a read-out signal from either said first or second potentiometer adapted to be fed to said recorder to drive same, said flip-flop having a first and second input channel thereto operatively coupled respectively to the wiper of said first and second potentiometer, said flip-flop being responsive to receipt of a said reference signal via said first input channel to switch said flip-flop to said second state and responsive to receipt of a said reference signal via said second input channel to switch said flip-flop to said first state.

References Cited

UNITED STATES PATENTS

| | | | |
|---|---|---|---|
| 2,619,527 | 11/1952 | Gray | 73—189 XR |
| 2,681,569 | 6/1954 | Hirschoff | 73—188 |
| 2,796,598 | 6/1957 | Cartwright | 340—271 XR |
| 2,770,129 | 11/1956 | Dalzell | 73—188 |

OTHER REFERENCES

Daley, J. C.: Principles of Electronics and Electronic Systems, 1956, U.S. Naval Institute, 492 pages, pages 185–187, relied upon, (copy available from Examiner J. J. Smith).

JAMES J. GILL, *Primary Examiner.*

RICHARD C. QUEISSER, *Examiner.*

J. J. SMITH, *Assistant Examiner.*